United States Patent
Richard

[15] 3,640,028
[45] Feb. 8, 1972

[54] METHOD OF REMOVING MOLDING FLASH AND THE LIKE FROM THE SURFACE OF GOLF BALLS

[72] Inventor: Henry P. Richard, South Hadley Falls, Mass.

[73] Assignee: A.G. Spalding & Bros. Inc., Chicopee, Mass.

[22] Filed: July 9, 1969

[21] Appl. No.: 840,438

[52] U.S. Cl..................................51/289 S, 51/103 WH
[51] Int. Cl..........................................B24b 1/00
[58] Field of Search....................51/289 S, 103 WH

[56] References Cited

UNITED STATES PATENTS

| R22,358 | 8/1943 | Arpin | 51/103 |
| 1,707,708 | 4/1929 | Caster | 51/289 X |
| 2,413,880 | 1/1947 | Mason | 51/289 X |
| 1,733,863 | 10/1929 | Caster | 51/103 |

*Primary Examiner*—Lester M. Swingle
*Attorney*—Johnson & Kline

[57] ABSTRACT

The method of automatically removing molding flash and the like undesired material from golf balls having a molded outer surface provided with the usual dimples or depressions by a circumferential grinding operation and without damaging or interfering with the dimples.

5 Claims, 3 Drawing Figures

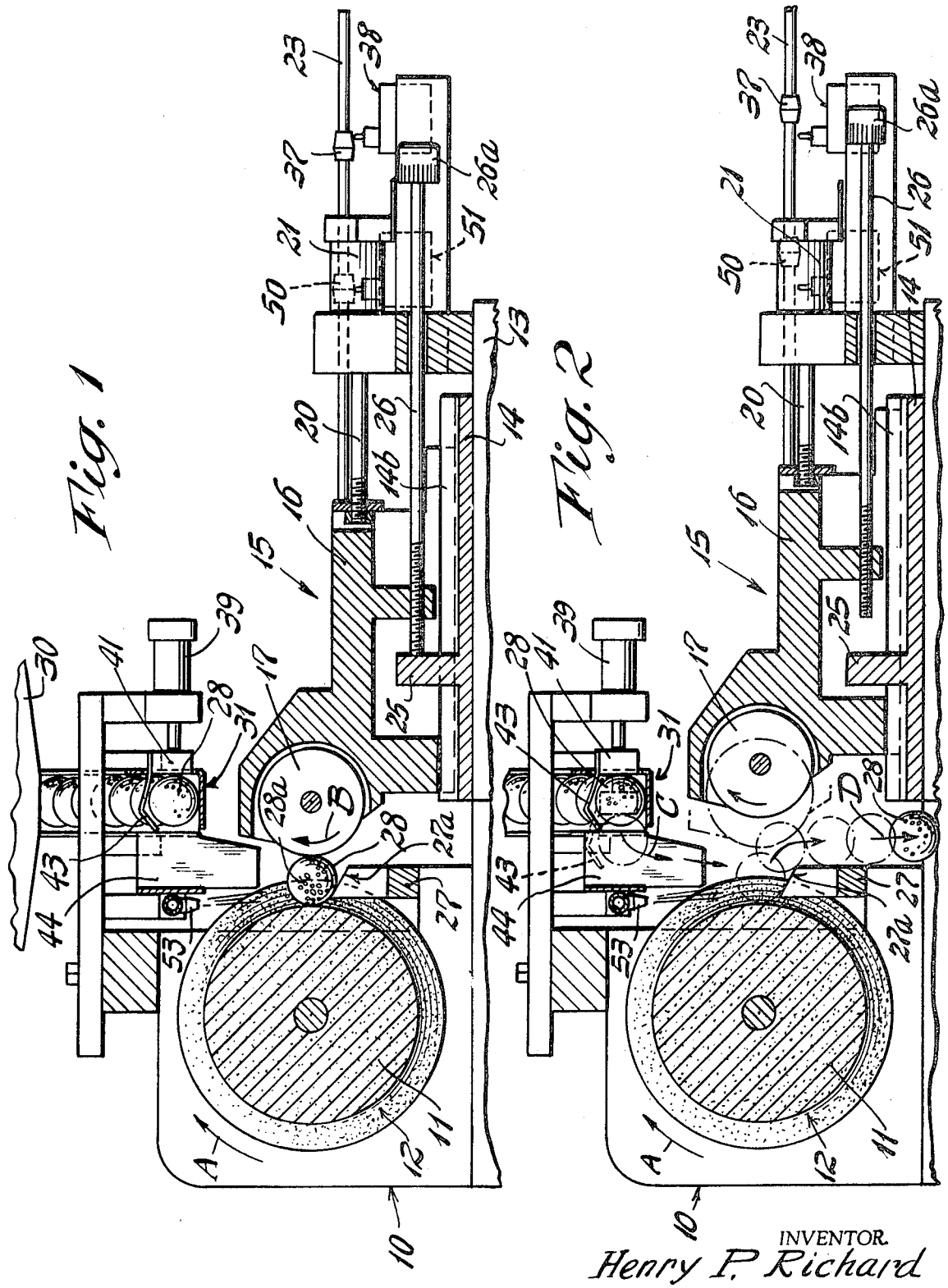

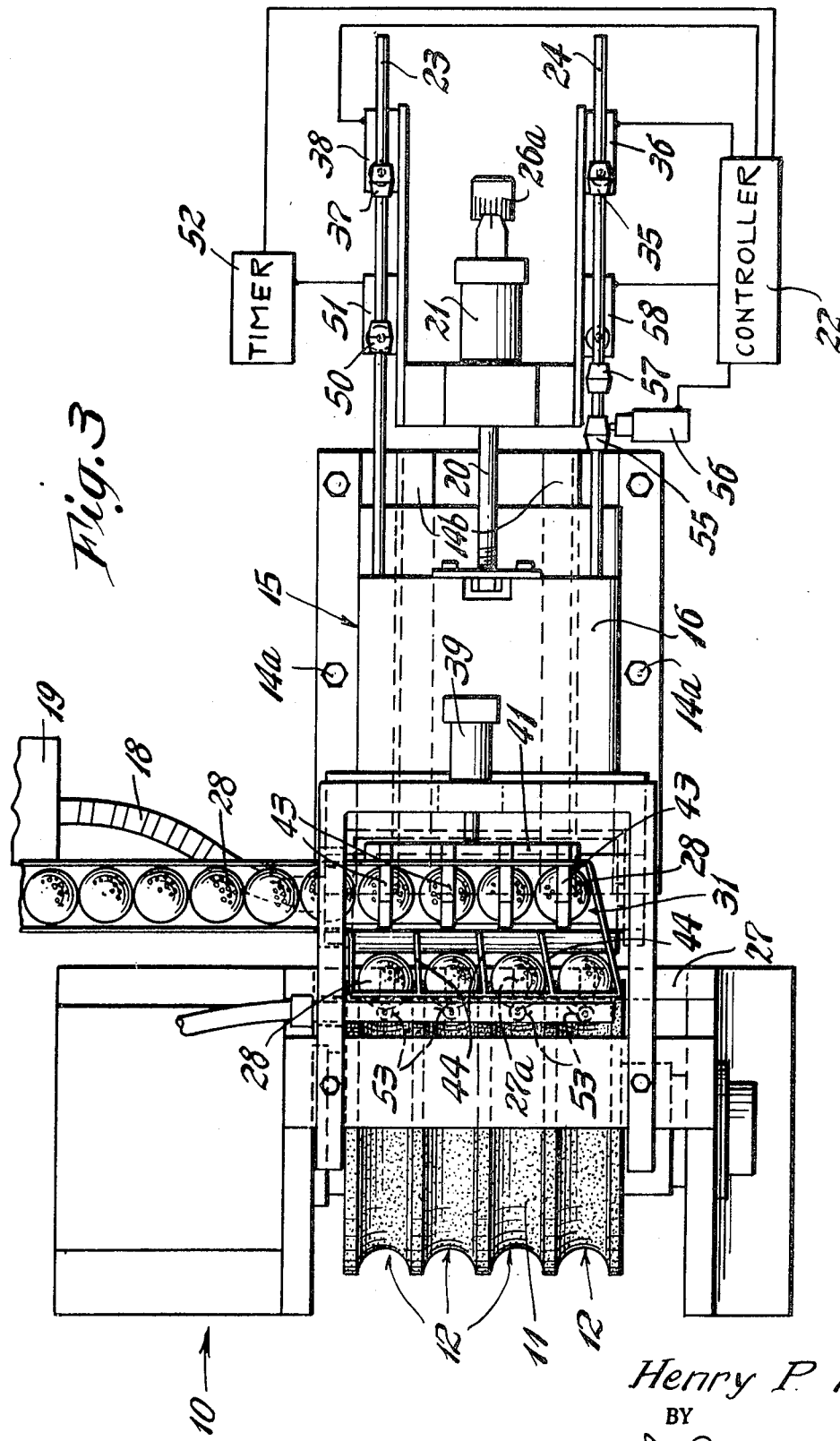

METHOD OF REMOVING MOLDING FLASH AND THE LIKE FROM THE SURFACE OF GOLF BALLS

Heretofore, in removing flash and projecting surface imperfections from molded golf balls, it has been the practice to subject the balls to three operations. First, the imperfections were spotted and the balls subjected to a spot grinding operation to remove the imperfections. Next, the balls were positioned in a chuck and rotated in one direction and moved into engagement with a grinding surface rotating in the opposite direction so as to remove the flash. The balls were then tumbled in a sandpaper tumbling barrel to remove any other imperfections. This required considerable handling of the balls, was time consuming, expensive, and not an extremely reliable series of operations.

The present invention overcomes these difficulties by providing a unique means for simultaneously removing flash and surface imperfections from the surface of molded golf balls having a dimpled surface automatically and without damage to the dimpled surface. This is accomplished by supporting the golf balls on a supporting bar, engaging them with a rotating feedwheel and moving the balls into a grooved rotating grinding wheel. The feedwheel is arranged to be stopped at a distance from the base of the grooved wheel equal to the molded diameter of the golf ball. The balls, during the grinding operation, are engaged by a spray from above which coacts with the dimples in the surface of the golf ball to cause the ball to gyrate during the circumferential grinding operation. The grinding operation is timed and after a predetermined time, the feedwheel is retracted causing the grinding to cease and the balls to drop from the support bar. The feedwheel is automatically moved from a retracted position to a position adjacent the grinding wheel. In this position the ball-feeding mechanism from a hopper is actuated to deliver a plurality of balls, one for each groove, to the support bar and the feedwheel engages the balls and moves them gradually toward the grinding wheel to provide for the circumferential grinding operation.

A feature of the invention resides in the fact that the location of the feedwheel is accurately determined so that there will not be any undesired grinding of the molded surface of the ball as might destroy or damage the dimples.

Other features and advantages of the invention will be apparent from the specification and claims when considered in connection with the accompanying drawings in which:

FIG. 1 is a longitudinal sectional view with the feedwheel in grinding position.

FIG. 2 is a view similar to FIG. 1 with the feedwheel in retracted position.

FIG. 3 is a top view of FIG. 1.

In accordance with the method of the present invention, golf balls having a predetermined diameter and a molded surface of elastomeric material provided with a plurality of dimples have the flash and unwanted surface material, such as imperfections and the like which are undesirable, removed automatically and simultaneously without interference with or damaging the dimpled surface.

As shown in the drawings, a frame 10 has an abrasive grinding wheel 11 mounted thereon and rotated in the direction of the arrow A by a suitable drive means (not shown). The grinding wheel has a plurality of annular semicircular grooves 12, herein illustrated as four in number, with the radius of curvature of each groove being slightly greater than the desired radius of the ball to be circumferentially ground to have the flash and imperfections removed.

The frame has a table 13 projecting therefrom and adjustably carrying a base 14 locked in position by bolts 14a and slidably supporting on ways 14b a feedwheel assembly 15 in predetermined position with respect to the grinding wheel. The feedwheel assembly includes a carrier 16 mounted on the base for movement to and from a retracted position and rotatably supports a feedwheel 17 which is driven through a flexible drive shaft 18 from a motor 19 (FIG. 3) to rotate in the direction of arrow B. The carrier 16 is connected by a piston rod 20 to a piston and cylinder unit 21 carried by the base and controlled from a controller panel 22 to move in predetermined sequence as determined by actuators therefor carried by a pair of rods 23, 24 projecting rearwardly from the carrier.

The base 14 has an abutment 25 thereon and the carrier 16 has a threaded stop rod 26 which is rotated by knob 26a to engage the abutment to limit the movement of the feedwheel in grinding position as shown in FIG. 1. In this position the distance between the feedwheel and the bottom of the semicircular groove 12 in the grinding wheel equals the diameter of the molded ball and can be accurately set by the adjustment of the stop rod.

The frame also carries a support bar 27 adjacent the grinding wheel and provided with supporting surfaces 27a to support a ball 28 having a dimpled surface 28a in cooperative grinding position with respect to the semicircular groove in the grinding wheel.

The balls are fed from a hopper 30 and are supported in a chute or trough 31 located above the grinding position and are moved to be supported by the supporting bar 27 and engaged by the feedwheel 17 to be rotated and moved to the grinding position as is shown in FIG. 1.

In carrying out the method, the piston and cylinder unit 21 is energized to move the carrier 16 forward toward the grinding wheel. The actuator 35 (FIG. 3) on rod 24 actuates a switch 36 connected to the controller panel to slow the movement of the piston. When the feedwheel is in the dotted position shown in FIG. 2, the actuator 37 on rod 23 operates a microswitch 38 which energizes the solenoid 39 through the controller panel. The solenoid 39 moves a pusher plate 41 to the left to the dotted position in FIG. 2 and slides the golf balls resting in the trough or chute 31 from the trough so that they drop into position to engage the supporting surface 27a of the supporting bar 27.

The fingers 43 carried by the plate 41 and extending above the balls prevent them from vibrating out of position as they move from the chute to drop in the direction of the arrow C. The balls are guided as they drop by guide plates 44 so as to be located in position to be engaged by the feedwheel 17 and moved into the channels 12 to be in the grinding position shown in FIG. 1. In this position it will be noted that the threaded stop rod 26 has engaged the abutment 25, the stop rod having been adjusted so that the feedwheel is at a distance from the bottom of the annular semicircular groove equal to the desired diameter of the ball.

With the carrier 16 in this position an actuator 50 engages the switch 51 to start the timer 52 and initiate the timing cycle for the grinding operation during which the ball is circumferentially ground and the molding flash and the like removed without damage to the dimples.

During this period each ball is subjected to spray from a spray nozzle 53 disposed above it, which spray cooperates with the dimples in the surface of the ball to cause the ball to gyrate and cause all surfaces to be presented to the grinding wheel during the circumferential grinding operation.

At the end of the time period the piston and cylinder unit 21 is reversed and the carrier 16 is retracted. An actuator 55 will engage switch 56 and cause the energizing circuit to the solenoid 39 to be cancelled so that the solenoid will not be energized during the retracting stroke to operate the plate 41 to feed the balls to grinding position. As the carriage moves back, the feedwheel moves away from the balls and permits them to drop from the support surface 27a in the direction of the arrow D of FIG. 2. In its retracted position, an actuator 57 engages the microswitch 58 to cause the control panel to reverse the operation of the piston and cylinder unit and initiates a new cycle of operation to repeat the method.

By this method a large number of balls can be automatically carried through the steps of removing the flash and imperfections with a minimum of handling and a minimum of operations.

Variations and modifications may be made within the scope of the invention and portions of the improvements may be used without others.

I claim:

1. A method of simultaneously removing flash and undesired surface material from a molded golf ball having an outer surface of elastomeric material provided with a plurality of dimples in the outer surface and without interfering with said dimpled surface by the steps of: feeding said golf ball from a supply to a supported position, engaging and moving said supported ball by a movable rotating feedwheel for rotating and moving said ball into a semicircular annular groove on a rotating grinding wheel, stopping the feedwheel at a distance from the bottom of the semicircular annular groove equal to a required diameter of the ball, initiating a timing cycle for a grinding operation for circumferentially grinding the ball to enable the material projecting beyond the desired surface of the ball to be removed without damaging the dimpled surface, retracting the feedwheel after the timing cycle and at the end of the grinding operation, and dropping the finished ball from the supported position.

2. A method of simultaneously removing flash and undesired surface material from a plurality of separate golf balls having a molded outer surface of elastomeric material provided with a plurality of dimples in the surface and without interfering with said dimpled surface by the steps of: feeding said plurality of separate molded golf balls from a supply to a supported position, engaging and moving said supported balls by a movable rotating feedwheel and thereby moving said balls into a grinding position with respect to a plurality of semicircular annular grooves on a rotating grinding wheel, stopping the feedwheel at a distance from the bottom of the semicircular annular grooves equal to a desired diameter of said ball, initiating a timing cycle for a grinding operation for circumferentially grinding the balls to enable the undesired surface material projecting from the molded surface of the ball to be removed without interfering with the dimpled surface, retracting the feedwheel after the timing cycle and at the end of the grinding operation, and dropping the finished balls from the supported position.

3. In the method as defined in claim 2, the step of subjecting the balls to a liquid spray during the circumferential grinding operation so that the spray coacts with the dimpled surface to cause the balls to gyrate.

4. In the method as defined in claim 2, the step of advancing the feedwheel from retracted position and feeding a plurality of balls from a supply at a predetermined point in the advance of said feedwheel to be engaged by the feedwheel and moved into circumferential grinding relation with the grinding wheel to remove flash from the ball.

5. The method as defined in claim 2 including positioning the balls in a line in side-by-side relation and extending parallel to and above the grinding position, engaging the line of balls and pushing said balls laterally from said side-to-side position to drop therefrom, and individually guiding said balls as they drop and directing the balls to the supported position.

* * * * *